(12) United States Patent
Ovsiannikov et al.

(10) Patent No.: US 8,988,598 B2
(45) Date of Patent: Mar. 24, 2015

(54) METHODS OF CONTROLLING IMAGE SENSORS USING MODIFIED ROLLING SHUTTER METHODS TO INHIBIT IMAGE OVER-SATURATION

(75) Inventors: Ilia Ovsiannikov, Studio City, CA (US); Joon Ho Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 277 days.

(21) Appl. No.: 13/617,867

(22) Filed: Sep. 14, 2012

(65) Prior Publication Data

US 2014/0078381 A1    Mar. 20, 2014

(51) Int. Cl.
*H04N 5/222* (2006.01)

(52) U.S. Cl.
USPC .......................................... 348/370; 348/371

(58) Field of Classification Search
USPC ........................................................ 348/370
See application file for complete search history.

(56) References Cited

U.S. PATENT DOCUMENTS

| | | | |
|---|---|---|---|
| 6,999,125 B2 | 2/2006 | Fujiwara et al. | |
| 2003/0107656 A1* | 6/2003 | Ito et al. | 348/216.1 |
| 2006/0202036 A1* | 9/2006 | Wang et al. | 235/462.07 |
| 2007/0147811 A1* | 6/2007 | Nakao et al. | 396/18 |
| 2007/0201859 A1 | 8/2007 | Sarrat | |
| 2010/0290674 A1 | 11/2010 | Kim | |

FOREIGN PATENT DOCUMENTS

| | | |
|---|---|---|
| JP | 2002-095015 | 3/2002 |
| KR | 20100122988 A | 11/2010 |
| KR | 20110011244 A | 2/2011 |

* cited by examiner

*Primary Examiner* — Usman Khan
(74) *Attorney, Agent, or Firm* — Myers Bigel Sibley & Sajovec, PA (57) ABSTRACT

An image capture device includes an image sensor having an array of pixels therein, which are configured to receive light reflected from an object during an image capture time interval. A light source is provided, which is configured to project light to the object during at least a portion of the image capture time interval. A control circuit/unit is provided, which is electrically coupled to the image sensor and the light source. This control circuit is configured to drive the light source with signals that cause the light source to project light to the object without interruption during at least a first time interval when all rows of a frame of pixels within the array are being sequentially read and during a second time interval when all rows of the frame of pixels within the array are being sequentially read.

16 Claims, 11 Drawing Sheets

METHODS OF CONTROLLING IMAGE SENSORS USING MODIFIED ROLLING SHUTTER METHODS TO INHIBIT IMAGE OVER-SATURATION

FIELD

The present invention relates to image capture devices and methods of operating same and, more particularly, to three-dimensional (3D) image capture devices and methods of operating same.

BACKGROUND

With the widespread dissemination of cameras, technology for taking three-dimensional (3D) images using information about a distance to an object as well as a two-dimensional image of the object has received attention. A device for acquiring information about a distance to an object and sensing the distance is called a depth sensor. A 3D image sensor that obtains a 3D image using the depth sensor is called a 3D image sensor.

The depth sensor measures a delay time between pulse light emitted from a light source which is then reflected from an object and received by the image sensor. A pixel of the depth sensor includes a plurality of photoelectric conversion elements. Each of the photoelectric conversion elements generates photocharge in proportion to the quantity of pulse light emitted by a light source and then reflected and returned from the object. A difference between a time of emission of the pulse light and a time of sensing the pulse light is called a time of flight (TOF). The distance to the object can be calculated from the TOF and the speed of the pulse light. In other words, the depth sensor calculates the distance to the object using the charge generated by the photoelectric conversion element. A 3D image can be realized using the distance calculated by the depth sensor and color information acquired by another sensor. However, the quality of the 3D image may be low due to various types of interference. Techniques for preventing the interference have been developed.

SUMMARY

An image capture device according to some embodiments of the invention includes an image sensor having an array of pixels therein, which are configured to receive light reflected from an object during an image capture time interval. This image sensor may include an image sensor pixel array, a row address decoder, a row driver, a column driver and a column address decoder, for example. A light source is also provided, which is configured to project light to the object during at least a portion of the image capture time interval. Among other things, this light source is provided to facilitate the capture of three-dimensional (3D) depth information relating to the object. A control circuit/unit is provided, which is electrically coupled to the image sensor and the light source. This control circuit is configured to drive the light source with signals that cause the light source to continuously project light to the object (without interruption) during at least a first time interval ($t_{SRA}$) when all rows of a frame of pixels within the array are being sequentially read (and then immediately reset) to yield a first frame of image data and during a second time interval ($t_{SRA}$) when all rows of the frame of pixels within the array are being sequentially read to yield a second frame of image data.

According to additional embodiments of the invention, the control circuit may be further configured to drive the light source with signals that cause the light source to terminate projection of light to the object during a time interval ($t_{LED1}$) when all of the rows of the frame of pixels within the array are concurrently capturing image data and none of the rows are being read. This control circuit may also be configured to drive the image sensor with signals that cause the frame of pixels to collect three-dimensional (3D) depth information associated with the first and second frames of image data during the first and second time intervals and also during a data integration time interval ($t_{VB}$) extending between the first and second time intervals.

According to additional embodiments of the inventive concept, there is provided an image sensor control method including the operations of performing a readout operation and a reset operation on first through n-th rows sequentially in a pixel array, where "n" is an integer of at least 2; turning off a light source for a first duration after completing the readout and reset operations; and performing the readout and reset operations on the first through n-th rows sequentially in the pixel array after the first duration elapses. The operation of performing the readout and reset operations on the first through n-th rows sequentially in the pixel array may include turning on and off a select transistor and a reset transistor comprised in each pixel in the first through n-th rows sequentially in the pixel array. The operation of performing the readout and reset operations on the first through n-th rows sequentially in the pixel array after the first duration elapses may include turning on and off the select transistor and the reset transistor comprised in each pixel in the first through n-th rows sequentially in the pixel array. The light source may be a light emitting diode.

According to further embodiments of the inventive concept, there is provided an image sensor control method including the operations of performing a readout operation, a reset operation, and an integration operation on first through n-th rows sequentially in a pixel array at least two times, where "n" is an integer of at least 2; turning off a light source after repeating the readout, reset, and integration operations of the first through n-rows at least two times and turning on the light source after a first duration elapses; and performing the readout, reset, and integration operations on the first through n-th rows sequentially in the pixel array at least two times after the light source is turned on. The readout, reset, and integration operations may be performed by turning on and off a transfer transistor, a select transistor, and a reset transistor, which are comprised in each cell in the first through n-th rows in the pixel array. The operation of performing the readout operation, the reset operation, and the integration operation on the first through n-th rows sequentially in the pixel array at least two times may include performing the readout, reset, and integration operations on each row four times.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF THE EMBODIMENTS

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
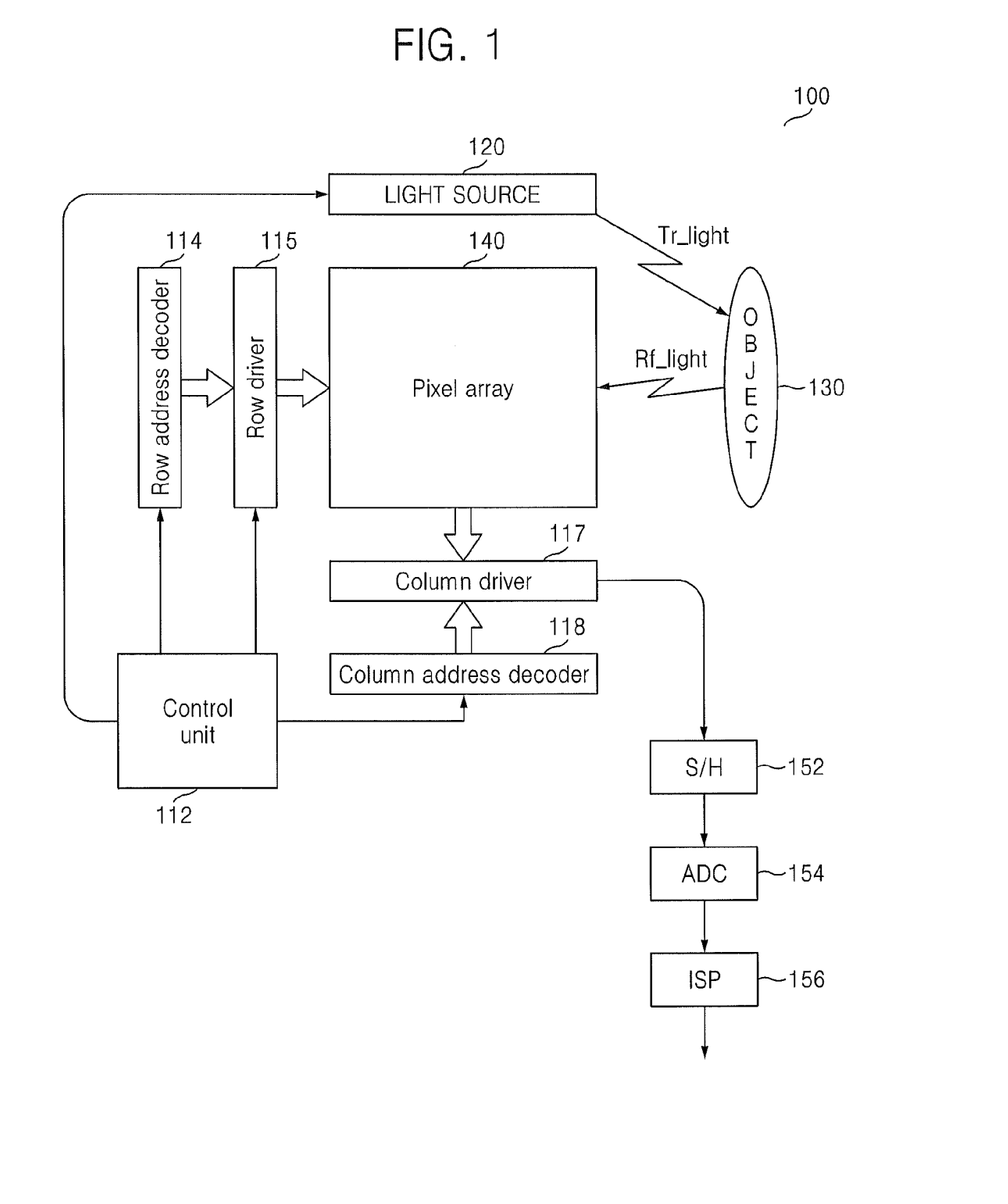
FIG. 1 is a block diagram of an image sensor according to some embodiments of the inventive concept.

FIG. 1 is a block diagram of an image sensor 100 according to some embodiments of the inventive concept. The image sensor 100 illustrated in FIG. 1 uses an image sensor control method according to some embodiments of the inventive concept and is used to obtain a three-dimensional (3D) image signal. The image sensor 100 includes a light source 120, a pixel array 140, a control unit 112, a row address decoder 114, a row driver 115, a column driver 117, a column address decoder 118, a sample and hold (S/H) block 152, an analog-to-digital converter (ADC) 154, and an image signal processor (ISP) 156. The light source 120 may emit light to an object 130 according to the control of the control unit 112. Although any of various types of light emitting devices that can emit modulated light may be used as the light source 120, a light emitting diode (LED) may be usually used as the light source 120. The pixel array 140 may have a structure in which a plurality of pixels (148a, 148b, 148c, or 148d), which will be described with reference to FIGS. 2A through 2D, are arranged in a matrix form. The pixels included in the pixel array 140 may output pixel signals (e.g., a color image signal and a distance signal) by columns in response to a plurality of control signals generated by the row driver 115.

The control unit 112 may output a plurality of control signals for controlling the operations of the light source 120, the pixel array 140, the row address decoder 114, the row driver 115, the column driver 117, the column address decoder 118, the S/H block 152, the ADC 154, and the ISP 156 and may generate addressing signals for the output of signals (e.g., a color image signal and a distance signal) sensed by the pixel array 140. In detail, the control unit 112 may control the row address decoder 114 and the row driver 115 to select a row line to which a certain pixel is connected, so that a signal sensed by the certain pixel among a plurality of pixels included in the pixel array 140 is output. In addition, the control unit 112 may control the column driver 117 and the column address decoder 118 to select a column line to which a certain pixel is connected. The control unit 112 may also control the light source 120 to emit light periodically and may control on/off timing of photoelectric conversion elements for sensing a distance in pixels included in the pixel array 140.

The row address decoder 114 decodes a row control signal output from the control unit 112 and outputs the decoded row control signal. The row driver 115 selectively activates a row line in the pixel array 140 in response to the decoded row control signal.

The column address decoder 118 decodes a column control signal (e.g., an address signal) output from the control unit 112 and outputs the decoded column control signal. The column driver 117 selectively activates a column line in the pixel array 140 in response to the decoded column control signal.

The S/H block 152 may sample and hold a pixel signal output from a pixel selected by the row driver 115 and the column driver 117. In detail, the S/H block 152 may sample and hold signals output from a pixel selected by the row driver 115 and the column driver 117 among the plurality of pixels included in the pixel array 140.

The ADC 154 may perform analog-to-digital conversion on signals output from the S/H block 152 and output digital pixel data. At this time, the S/H block 152 and the ADC 154 may be integrated into a single chip. The ADC 154 may include a correlated double sampling (CDS) circuit (not shown), which performs CDS on signals output from the S/H block 152. At this time, the ADC 154 may compare a CDS signal with a ramp signal (not shown) and output a comparison result as the digital pixel data.

The ISP 156 may perform digital image processing based on the pixel data output from the ADC 154. The ISP 156 may receive a signal generated by the pixels included in the pixel array 140, sense a time of flight (TOF) from the signal, and calculate a distance to the object 130. The ISP 156 may also interpolate an RGBZ Bayer signal and generate a 3D image signal using the interpolated signal. In addition, the ISP 156 may perform edge enhancement and pseudo-color suppression.

Figure 2A:
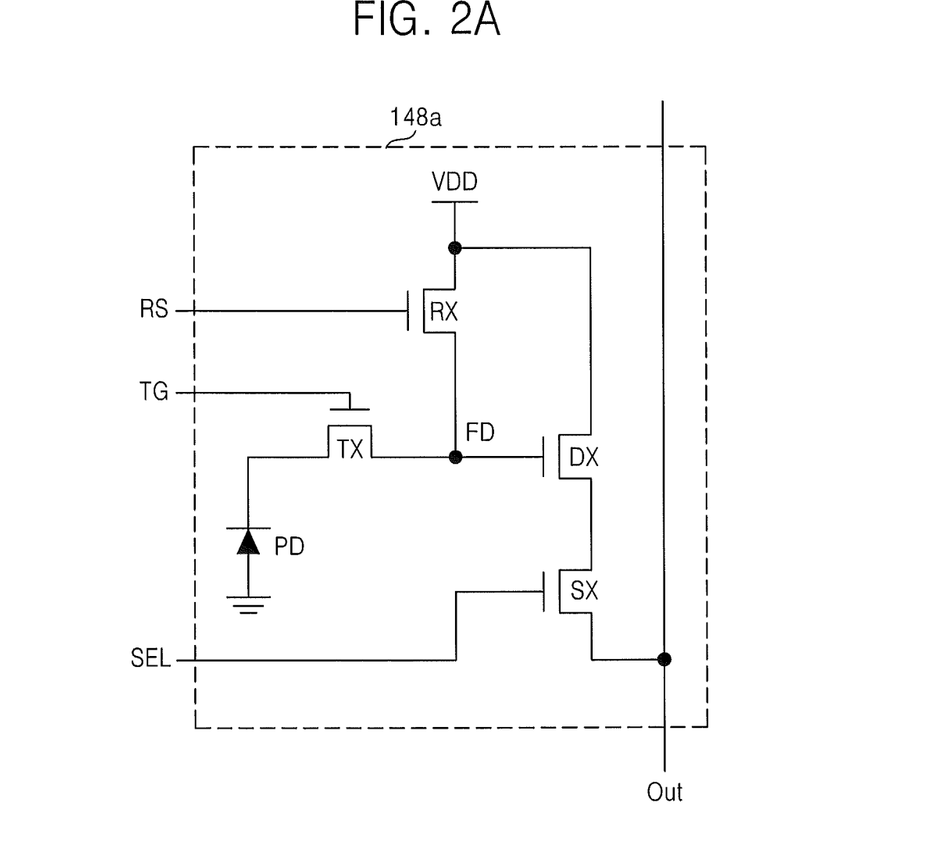
FIGS. 2A through 2D are circuit diagrams of examples of a pixel included in a pixel array of the image sensor illustrated in FIG. 1.

FIGS. 2A through 2D are circuit diagrams of examples of a pixel included in the pixel array 140 of the image sensor 100 illustrated in FIG. 1. Referring to FIG. 2A, a unit pixel 148a includes a photodiode PD, a transfer transistor Tx, a floating diffusion node FD, a reset transistor Rx, a drive transistor Dx, and a select transistor Sx. The photodiode PD is an example of a photoelectric conversion element. The photodiode PD may include at least one among a photo transistor, a photo gate, a pinned photodiode (PPD), and a combination thereof.

Figure 2B:
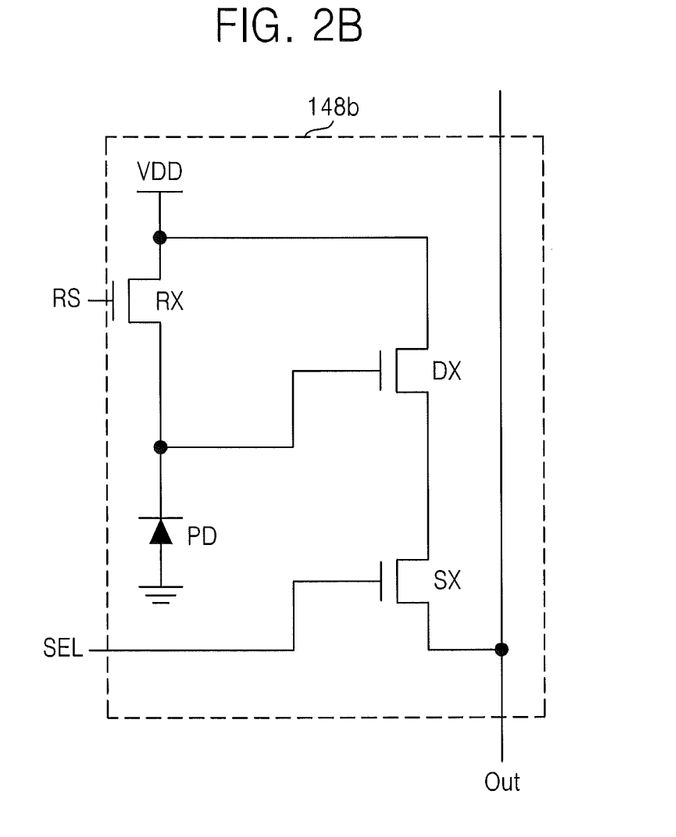
Figure 2C:
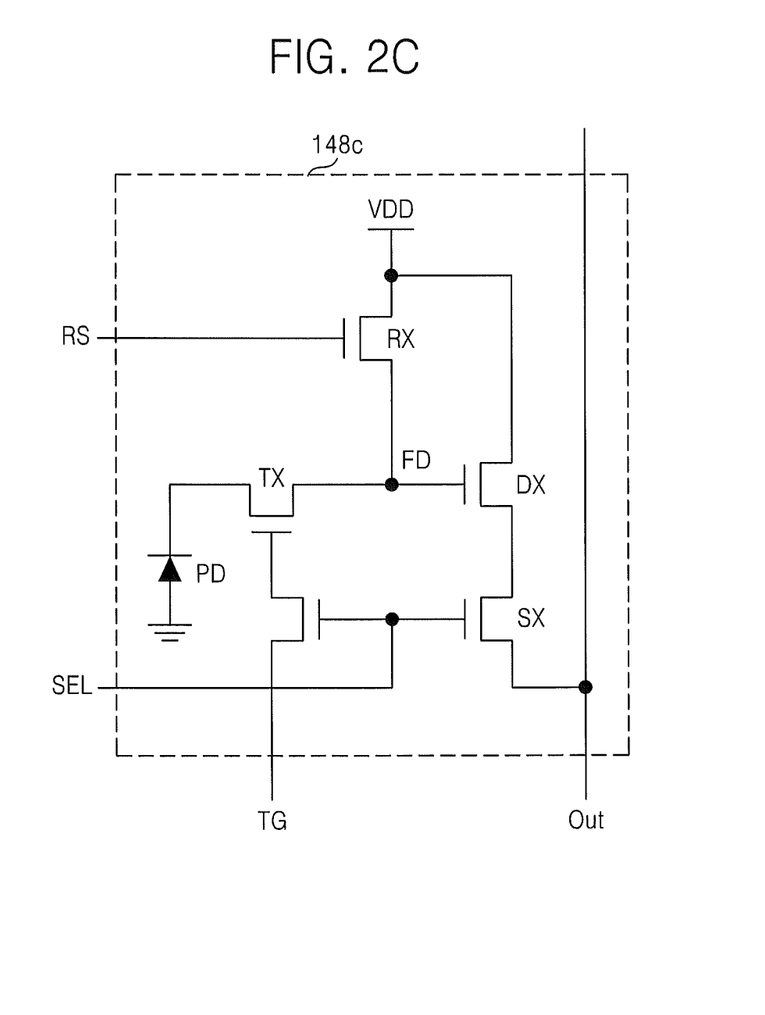
Figure 2D:
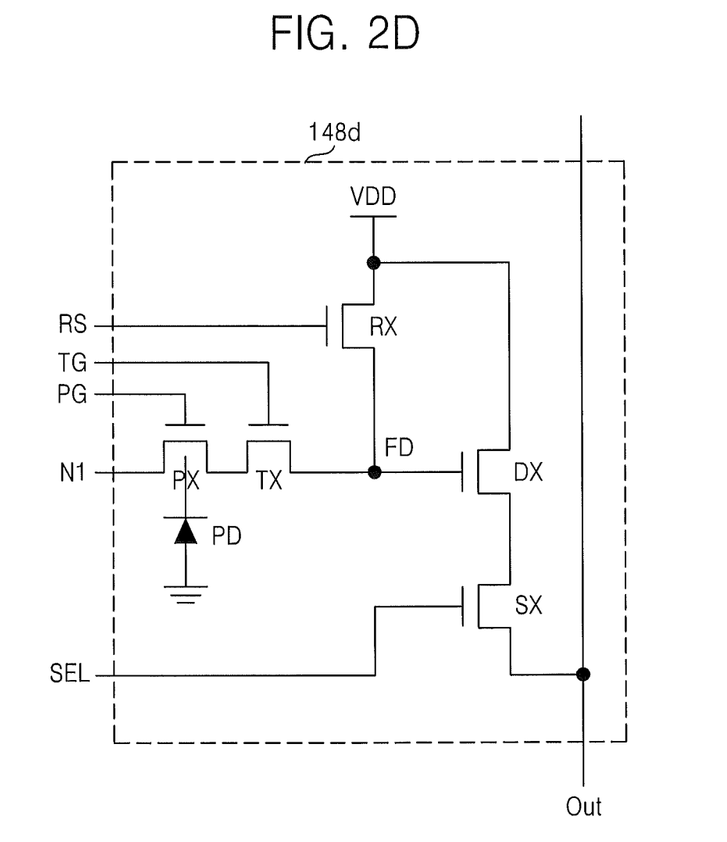

FIG. 2A shows a 4-transistor (4T) structure that includes a single photodiode PD and four MOS transistors Tx, Rx, Dx, and Sx, but the present invention is not restricted to this example (see, e.g., FIGS. 2B-2D). Any circuits including at least three transistors including the drive transistor Dx and the select transistor Sx and the photodiode PD may be used in the embodiments of the present invention.

In the operation of the pixel 148a, reflective light Rf_light reflected from the object 130 is incident on the pixel 148a and the photodiode PD generates photocharge varying with the intensity of the reflective light Rf_light. The transfer transistor Tx may transfer the photocharge to the floating diffusion node FD in response to a transfer control signal TG received from the control unit 112. The drive transistor Dx may transmit photocharge to the select transistor Sx based on the photocharge accumulated at the floating diffusion node FD. The select transistor Sx may output a pixel signal along a column line connected to the pixel 148a in response to a select signal SEL received from the control unit 112. The reset transistor Rx may reset the photocharge accumulated at the floating diffusion node FD in response to a reset signal RS received from the control unit 112.

Referring to FIG. 2B, an alternative unit pixel 148b has a 3-transistor (3T) structure that includes a photodiode PD, a reset transistor Rx, a drive transistor Dx, and a select transistor Sx. Referring to FIG. 2C, another unit pixel 148c can have a 5-transistor (5T) structure that includes a photodiode PD, a transfer transistor Tx, a reset transistor Rx, a drive transistor Dx, a select transistor Sx, and one more transistor Gx. Referring to FIG. 2D, a unit pixel 148d can have a 5T structure that includes a photodiode PD, a transfer transistor Tx, a reset transistor Rx, a drive transistor Dx, a select transistor Sx, and one more transistor Px. A node N1 connected to the one more transistor Px may be connected to a pixel adjacent to the unit pixel 148d.

Figure 3:
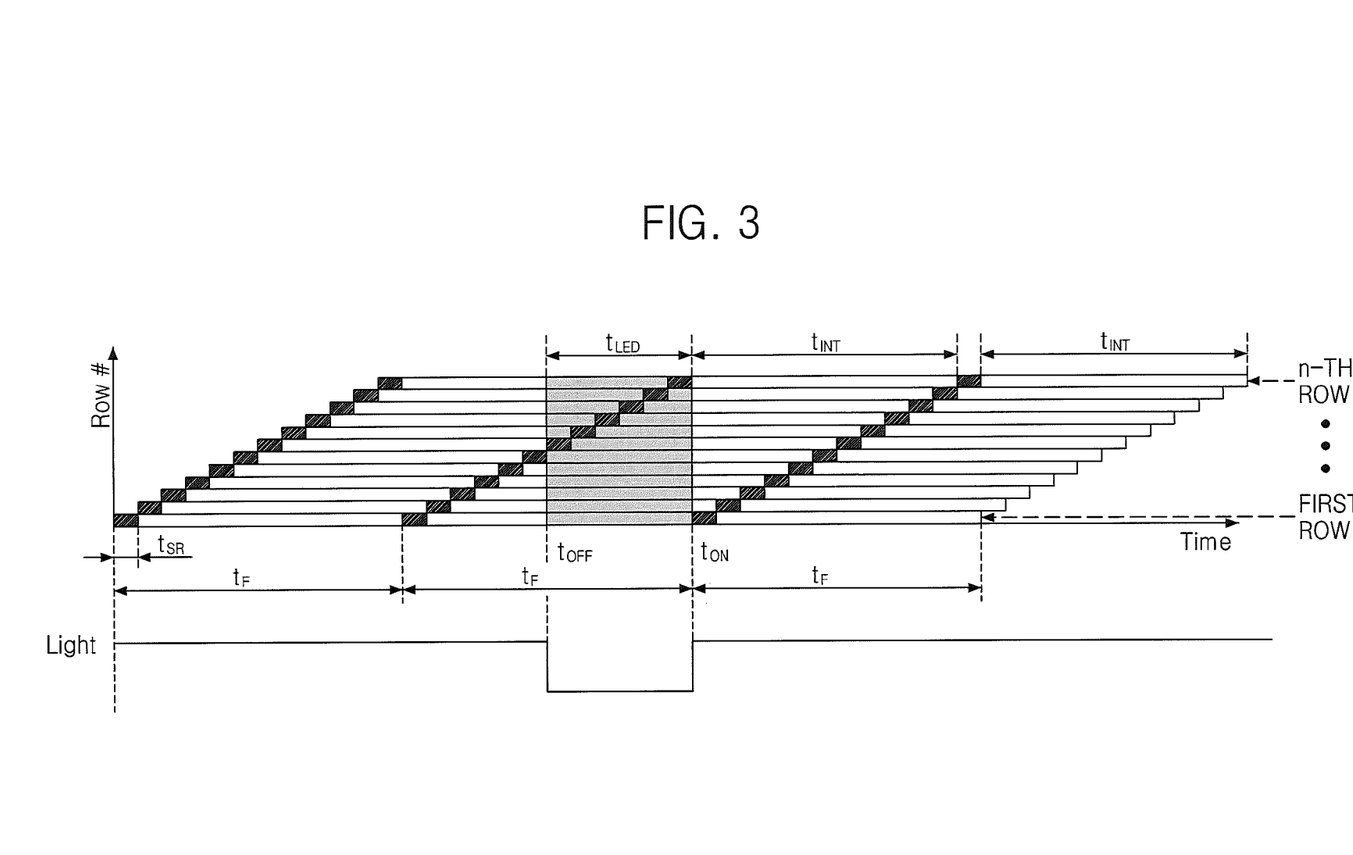
FIG. 3 is a timing chart showing an image sensor control method using a rolling shutter in a comparison example.

FIG. 3 is a timing chart showing an image sensor control method using a rolling shutter in a comparison example. Referring to FIG. 3, an integration cycle for each pixel begins with reset and ends with readout. A complementary metal oxide semiconductor (CMOS) image sensor performs reset, integration, and readout operations using a rolling shutter method by which the reset and readout operations are performed on pixels in different rows at different times. In other words, rows in the pixel array 140 are sequentially subjected to the sequential reset and readout operations. For instance, at the moment when integration starts on a first row after the completion of readout and reset of the first row, readout and reset may start on a second row. In the same manner, the following rows are sequentially subjected to readout and reset. After reset is completed with respect to an n-th row (where "n" is an integer of at least 2 and "n" is 12 in the comparison example illustrated in FIG. 3), readout of the next frame may be started.

In FIG. 3, $t_{SR}$ denotes a time taken to complete the readout and reset operations with respect to a single row, $t_{INT}$ denotes a time taken to complete the integration operation of a single row, and $t_F$ denotes a time taken to complete a single cycle of readout, reset, and integration on a single row. The time $t_F$ may be defined as $t_F = t_{SR} + t_{INT}$. The times $t_{SR}$ and $t_{INT}$ may be controlled to be the same in each row or frame.

Adjusting the light emission time of the light source 120 in an image sensor is necessary to prevent over-saturation and under-exposure. The over-saturation is a phenomenon in which depth information for calculation of a distance to an object is entirely lost because an output signal of the pixel array 140 is saturated due to an excessive light emission time of the light source 120. The under-exposure is a phenomenon in which depth information is damaged by a low signal-to-noise ratio (SNR) caused by background illumination resulting from an insufficient light emission time of the light source 120. The background illumination is a phenomenon in which interference is raised by a light other than the light source 120 of the image sensor. The SNR indicates the strength of a signal against noise. As the SNR increases, the quality of an image also increases.

Accordingly, it is necessary to periodically turn on and off the light source 120 in order to prevent the over-saturation and reduce power consumption of the image sensor. A time $t_{LED}$ denotes a time while the light source 120 is off. As shown by FIG. 3, the light source 120 is turned off at a time point $t_{OFF}$ and turned on at a time point $t_{ON}$ to reduce the over-saturation and the power consumption.

However, depth information may be damaged by the on/off operation of the light source 120. In detail, the light of the light source 120 is radiated at the first through seventh rows during the integration time $t_{INT}$ in a first frame (which is a period during which a first cycle of readout, reset, and integration is completed with respect to the first through n-th rows) while the light is radiated at the eighth through n-th rows during time less than the integration time $t_{INT}$. In other words, for instance, the light of the light source 120 is radiated at the twelfth rows in a second frame during the integration time $t_{INT}$ while the light is radiated at the twelfth row in the first frame during time less than the integration time $t_{INT}$. As described above, because the radiation time of light from the light source 120 is irregular between rows in one frame and between adjacent frames during the integration time $t_{INT}$, depth information is damaged.

Figure 4:
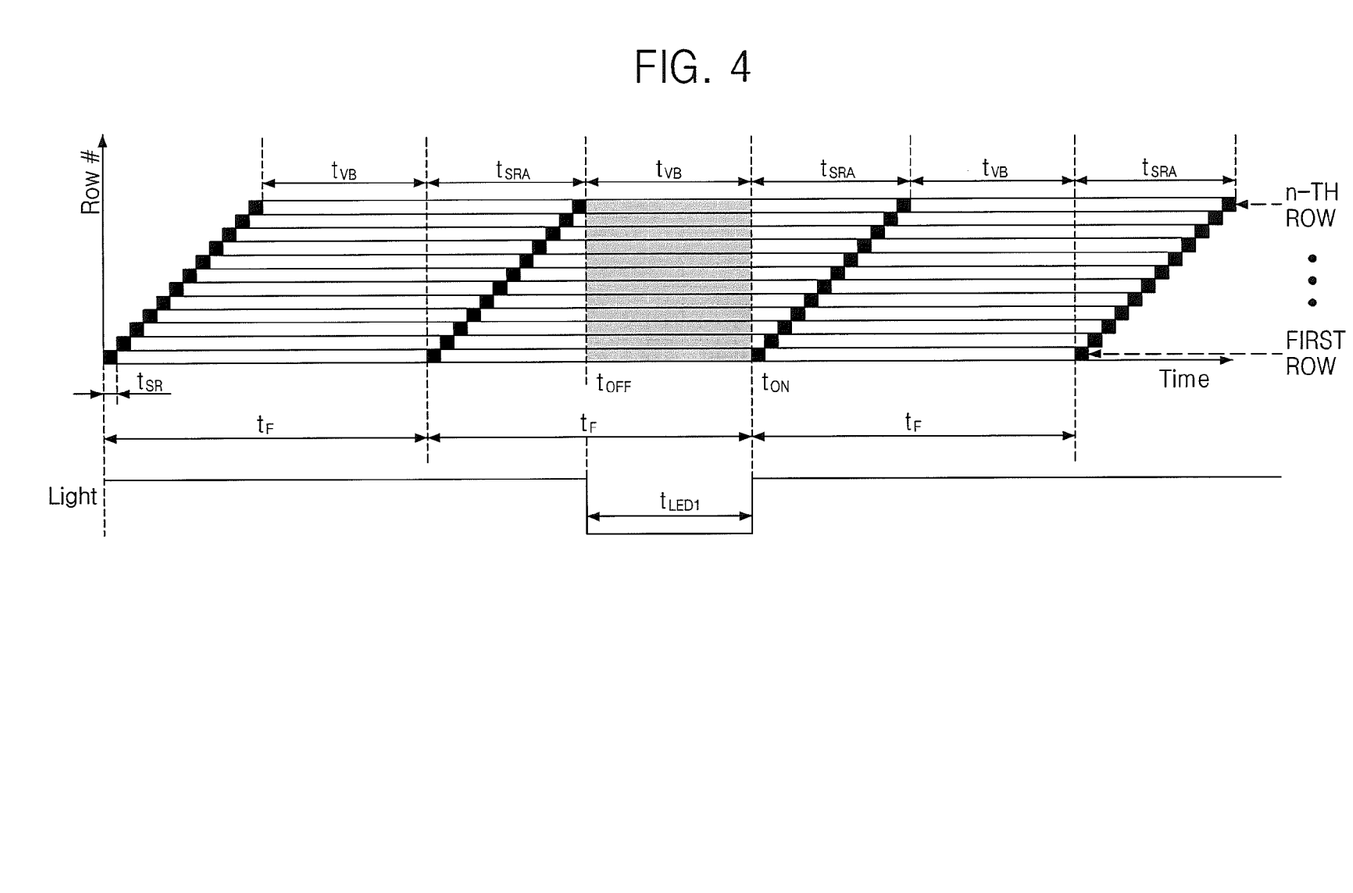
FIG. 4 is a timing chart showing an image sensor control method according to some embodiments of the inventive concept.

FIG. 4 is a timing chart showing an image sensor control method according to some embodiments of the inventive concept. Referring to FIG. 4, $t_{SRA}$ denotes a time during which a cycle of readout and reset is completed with respect to all of first through n-th rows (where "n" is an integer of at least 2) and $t_{VB}$ is a time obtained by subtracting the time $t_{SRA}$ from the time $t_F$. For convenience, it is assumed that "n" is 12. The time $t_{SR}$ illustrated in FIG. 4 is shorter than the time $t_{SR}$ illustrated in FIG. 3. The time $t_{SR}$ may be adjusted by controlling the timing of the reset signal RS applied to the reset transistor Rx and the select signal SEL applied to the select transistor Sx using the control unit 112. However, the inventive concept is not restricted to the current embodiments. The time $t_{SR}$ may be adjusted using various other circuits.

It is assumed that readout, reset, and integration of the pixel array 140 has been completed with respect to a first frame. Thereafter, a readout operation may be performed on each of the pixels included in the first row of the pixel array 140 with respect to a second frame. In other words, the select transistor Sx of each pixel in the first row is turned on by the select signal SEL output from the control unit 112, so that photocharge at the floating diffusion node FD is output to the column driver 117 via the drive transistor Dx. After a predetermined time during which the photocharge is output through the select transistor Sx, the select transistor Sx of each pixel in the first row is turned off and then a reset operation may be performed on the first row. In other words, the reset transistor Rx of each pixel in the first row is turned on by the reset signal RS output from the control unit 112, so that photocharge remaining in the floating diffusion node FD is eliminated. After a predetermined period of the reset operation, the reset transistor Rx is turned off and then a readout operation may be started with respect to the second row. In addition, photocharge integration may be started with respect to the first row in parallel with the start of the readout operation on the second row. In other words, the transfer transistor Tx of each pixel in the first row is turned on by the transfer control signal TG output from the control unit 112, so that photocharge generated by the photodiode PD is transferred to the floating diffusion node FD. These readout and reset operations may be repeated with respect to the rows sequentially until the reset operation of the twelfth row is completed.

The time $t_{SR}$ taken to complete the readout and reset operations with respect to each row may be adjusted by controlling the timing of the select signal SEL, the reset signal RS, and the transfer control signal TG output from the control unit 112. After the readout and reset operations on the first through twelfth rows are completed, that is, after the time $t_{SRA}$ elapses, the light source 120 may be turned off by the control unit 112. Until a readout operation on each pixel in the first row of the pixel array 140 is started with respect to a third frame, the off state of the light source 120 may be maintained for a first duration $t_{LED1}$. The first duration $t_{LED1}$ is a period of time while the light source 120 is off, and it may be less than or equal to the time $t_{VB}$.

While the light source 120 is off, the under-exposure phenomenon in which the SNR decreases may occur in the second frame since light radiation time is not sufficient. Accordingly, it is necessary to stop accumulating photocharge at the floating diffusion node FD for a second duration (not shown) during which the light source 120 is off for the first duration $t_{LED1}$. In other words, the transfer transistor Tx of every pixel in the first through twelfth rows of the pixel array 140 is simultaneously turned off by the transfer control signal TG output from the control unit 112, so that photocharge generated by the photodiode PD is blocked from being transferred to the floating diffusion node FD. After the second duration elapses, the transfer transistor Tx is turned on, so that the photocharge resumes to be transferred to the floating diffusion node FD. The second duration refers to a period of time while accumulation of photocharge at the floating diffusion node FD is stopped, and it may be included in the first duration $t_{LED1}$.

After the first duration $t_{LED1}$ elapses, the light source 120 is turned on, and a readout operation may be performed on each pixel in the first row of the pixel array 140 with respect to the third frame. In other words, the select transistor Sx of each pixel in the first row is turned on by the select signal SEL output from the control unit 112, so that photocharge at the floating diffusion node FD is output to the column driver 117 via the drive transistor Dx. After the predetermined time during which the photocharge is output through the select transistor Sx, the select transistor Sx of each pixel in the first row is turned off and then a reset operation may be performed on the first row. In other words, the reset transistor Rx of each pixel in the first row is turned on by the reset signal RS output from the control unit 112, so that photocharge remaining in the floating diffusion node FD is eliminated. After the predetermined period of the reset operation, the reset transistor Rx is turned off and then a readout operation may be started with respect to the second row. In addition, photocharge integration may be started with respect to the first row in parallel with the start of the readout operation on the second row. In other words, the transfer transistor Tx of each pixel in the first row is turned on by the transfer control signal TG output from the control unit 112, so that photocharge generated by the photodiode PD is transferred to the floating diffusion node FD. These readout and reset operations may be repeated with respect to the rows sequentially until the reset operation of the twelfth row is completed.

When the operation of the image sensor 100 is controlled as described above, the radiation time of the light from the light source 120 is maintained constant with respect to the first through twelfth rows in the second frame during photocharge integration of each row. Although the 12 rows exist in the pixel array 140 in the current embodiments illustrated in FIG. 4, the inventive concept is not restricted thereto.

It is also illustrated in FIG. 4 that the light source 120 is turned off only in the second frame, but the inventive concept is not restricted to the current embodiments. The light source 120 may be turned off in every frame or every m frame in order to prevent the over-saturation and the under-exposure, where "m" is an integer of at least 2.

In the image sensor control method according to the current embodiments, the radiation time of light from the light source 120 is the same with respect to all of rows included in the pixel array 140 during the photocharge integration of each row even if the light source 120 is turned off, so that the quality of images is increased. In addition, the photocharge integration is stopped together with the off of the light source 120, thereby preventing the SNR from decreasing.

Figure 5:
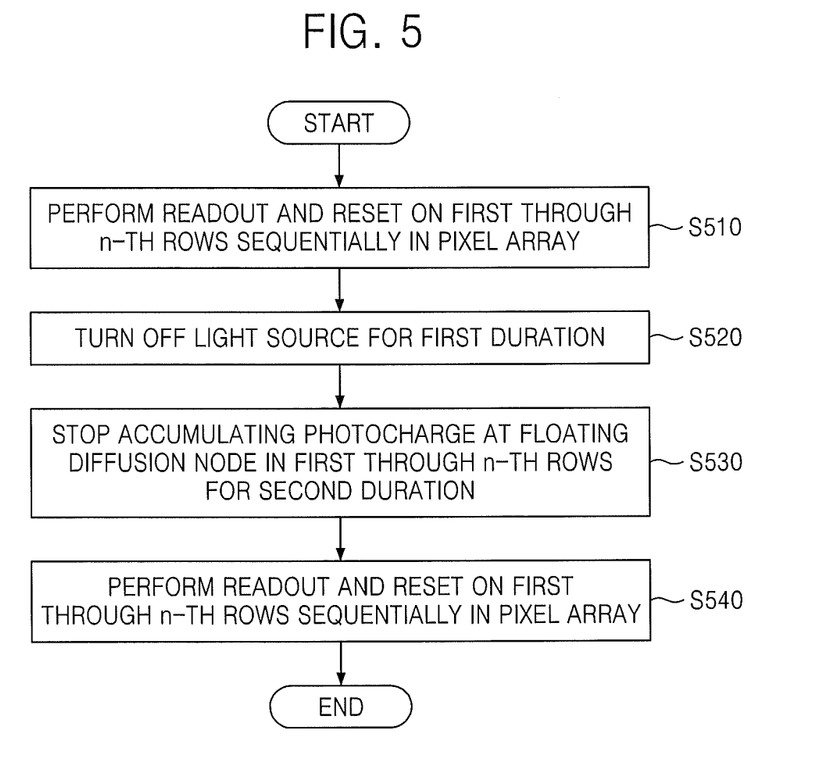
FIG. 5 is a flowchart of the image sensor control method illustrated in FIG. 4.

FIG. 5 is a flowchart of the image sensor control method illustrated in FIG. 4. Referring to FIGS. 4 and 5, readout and reset operations may be performed on the first through n-th rows sequentially in the pixel array 140 in operation S510. At this time, a readout operation on each pixel included in the first row of the pixel array 140 may be performed first. In other words, the select transistor Sx of each pixel in the first row is turned on by the select signal SEL output from the control unit 112, so that photocharge at the floating diffusion node FD is output to the column driver 117 via the drive transistor Dx. After a predetermined time during which the photocharge is output through the select transistor Sx, the select transistor Sx of each pixel in the first row is turned off and then a reset operation may be performed on the first row. In other words, the reset transistor Rx of each pixel in the first row is turned on by the reset signal RS output from the control unit 112, so that photocharge remaining in the floating diffusion node FD is eliminated. After a predetermined period of the reset operation, the reset transistor Rx is turned off and then a readout operation may be started with respect to the second row. In addition, photocharge integration may be started with respect to the first row in parallel with the start of the readout operation on the second row. In other words, the transfer transistor Tx of each pixel in the first row is turned on by the transfer control signal TG output from the control unit 112, so that photocharge generated by the photodiode PD is transferred to the floating diffusion node FD. These readout and reset operations may be repeated with respect to the rows sequentially until the reset operation of the twelfth row is completed.

After the reset operation on the n-th row is completed, the light source 120 may be turned off for the first duration $t_{LED1}$ in operation S520. In other words, after the readout and reset operations are completed with respect to the entire first through n-th rows, the light source 120 may be turned off by the control unit 112. Until a readout operation on each pixel in the first row of the pixel array 140 is started with respect to a subsequent frame, the off state of the light source 120 may be maintained for the first duration $t_{LED1}$. The first duration $t_{LED1}$ is a period of time while the light source 120 is off, and it may be less than or equal to the time $t_{VB}$.

In addition, after the readout and reset operations are completed with respect to all of the first through n-th rows, accumulation of photocharge at the floating diffusion node FD may be stopped in the first through n-th rows of the pixel array 140 for the second duration in operation S530. In other words, the transfer transistor Tx of every pixel in the first through n-th rows of the pixel array 140 is simultaneously turned off by the transfer control signal TG output from the control unit 112, so that photocharge generated by the photodiode PD is blocked from being transferred to the floating diffusion node FD. After the second duration elapses, the transfer transistor Tx is turned on, so that the photocharge resumes to be transferred to the floating diffusion node FD. The second duration refers to a period of time while the photocharge accumulation at the floating diffusion node FD is stopped, and it may be included in the first duration $t_{LED1}$.

After the first duration $t_{LED1}$ elapses, readout and reset operations may be performed on the first through n-th rows sequentially in the pixel array 140 in operation S540. In other words, after the first duration $t_{LED1}$ elapses, the light source 120 is turned on, and a readout operation may be performed on each pixel in the first row of the pixel array 140 with respect to the subsequent frame. In detail, the select transistor Sx of each pixel in the first row is turned on by the select signal SEL output from the control unit 112, so that photocharge at the floating diffusion node FD is output to the column driver 117 via the drive transistor Dx. After the predetermined time during which the photocharge is output through the select transistor Sx, the select transistor Sx of each pixel in the first row is turned off and then a reset operation may be performed on the first row. In other words, the reset transistor Rx of each pixel in the first row is turned on by the reset signal RS output from the control unit 112, so that photocharge remaining in the floating diffusion node FD is eliminated. After the predetermined period of the reset operation, the reset transistor Rx is turned off and then a readout operation may be started with respect to the second row. In addition, photocharge integration may be started with respect to the first row in parallel with the start of the readout operation on the second row. In other words, the transfer transistor Tx of each pixel in the first row is turned on by the transfer control signal TG output from the control unit 112, so that photocharge generated by the photodiode PD is transferred to the floating diffusion node FD. These readout and reset operations may be repeated with respect to the rows sequentially until the reset operation of the n-th row is completed.

Figure 6:
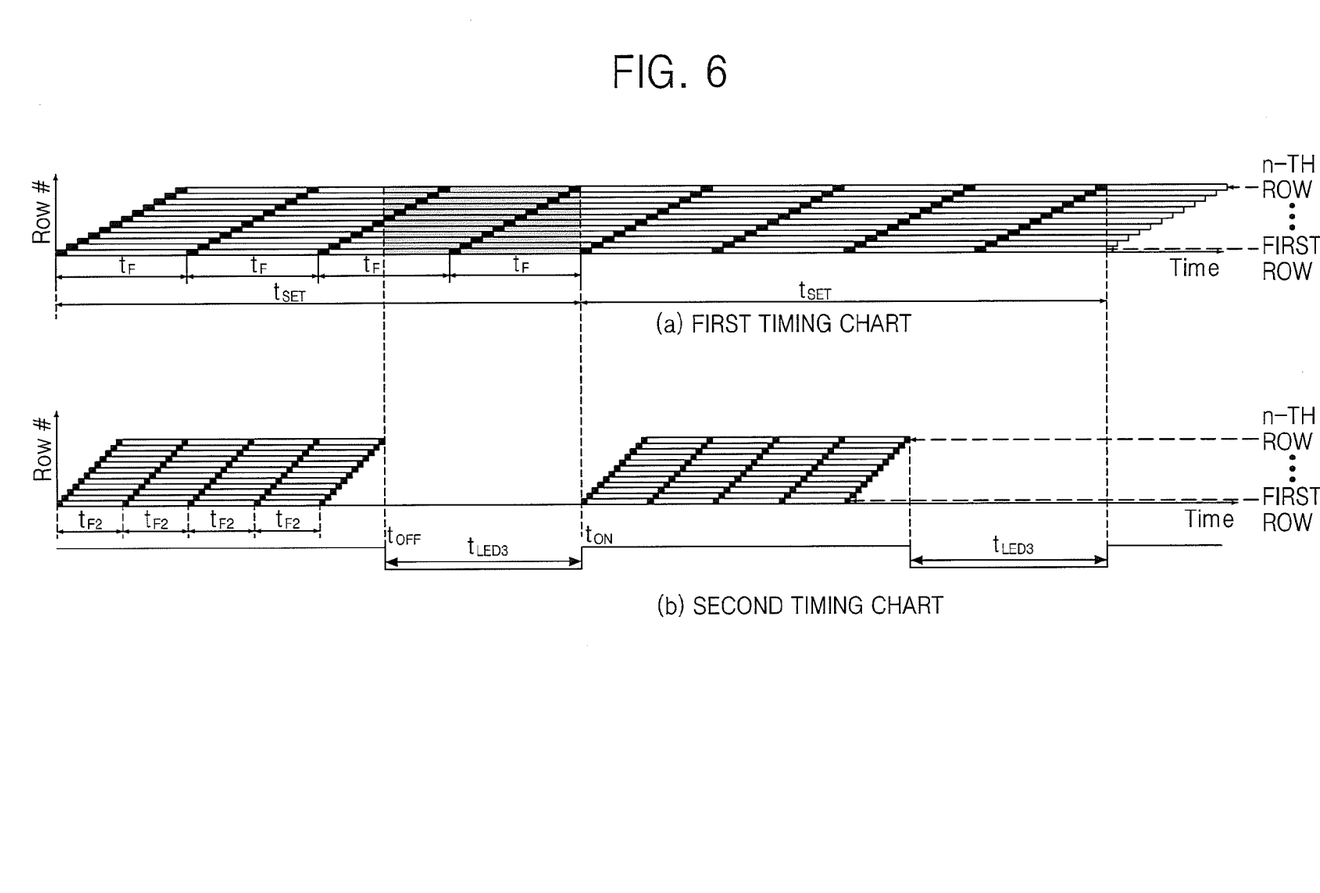
FIG. 6 is a timing chart showing an image sensor control method according to other embodiments of the inventive concept.

FIG. 6 is a timing chart showing an image sensor control method according to other embodiments of the inventive concept. There are two timing charts in FIG. 6. The upper one will be referred to as a first timing chart and the lower one will be referred to as a second timing chart. The first timing chart shows an image sensor control method in another comparison example. The second timing chart shows the image sensor control method according to the current embodiments of the inventive concept. Here, $t_{SET}$ denotes a time taken to form a single depth frame. In the image sensor 100 using CMOS-based TOF, four frames are needed to form a single depth frame. In the first timing chart, a time taken to complete a single cycle of readout, reset, and integration on a single row in the pixel array 140 is denoted by $t_F$. In the second timing chart, a time taken to complete a single cycle of readout, reset, and integration on a single row in the pixel array 140 is denoted by $t_{F2}$. The pixel array 140 may include first through n-th rows (where "n" is an integer of at least 2). For convenience, it is assumed that "n" is 12 in the FIG. 6.

When the light source 120 is turned off from a time point $t_{OFF}$ to a time point $t_{ON}$ in the first timing chart, this on-off operation of the light source 120 may damage depth information. When it is assumed that there are first through eighth frames from the left to the right, radiation time of light from the light source 120 is irregular with respect to the second through fourth frames during photocharge integration. In particular, most of the rows are not irradiated with the light of the light source 120 during the photocharge integration in the third frame, which may result in serious damage to the depth information (see, e.g., FIG. 6 (a)).

The time $t_{F2}$ taken to complete a single cycle of readout, reset, and integration on a single row in the pixel array 140 in the second timing chart is regularly reduced as compared to the time $t_F$ in the first timing chart. The time $t_{F2}$ may be adjusted by controlling the timing of the transfer control signal TG applied to the transfer transistor Tx, the reset signal RS applied to the reset transistor Rx, and the select signal SEL applied to the select transistor Sx using the control unit 112.

It is assumed that there are first through eighth frames from the left to the right in the second timing chart. When the time $t_{SET}$ taken to form a single depth frame is maintained constant, if the time $t_{F2}$ is reduced, a time taken to complete a cycle of readout, reset, and integration with respect to the first through n-th rows of the pixel array 140 up to a fourth frame (i.e., a time taken to form a first depth frame) is less than the time $t_{SET}$. After a reset operation on the twelfth row is completed in the fourth frame, the light source 120 may be turned off. The light source 120 may be turned on after a third duration $t_{LED3}$. After the third duration $t_{LED3}$ elapses, a readout operation may be performed on the first row in a fifth frame and the readout, reset and integration operations may be performed on the first through twelfth rows sequentially.

When the light emission timing of the light source 120 of the image sensor 100 is adjusted as described above, the radiation time of light from the light source 120 is maintained constant between frames during photocharge integration in the second timing chart (i.e., FIG. 6 (b)) unlike the first timing chart (i.e., FIG. 6 (a)). Since the time $t_{F2}$ is shorter than the time $t_F$, the radiation time is shorter in the embodiments illustrated in the second timing chart than in the comparison example illustrated in the first timing chart. However, the shorter radiation may be compensated for by adjusting the luminance of the light source 120.

In the second timing chart, an integration time $t_{INT}$ for a single row is the time $t_{F2}$ less the time $t_{SR}$ taken to complete the readout and reset operations on a single row. A minimum value $t_{INTMIN}$ of the time $t_{INT}$ is calculated using Equation 1:

$$t_{INTMIN} = (n-1)t_{SR}. \qquad (1)$$

The readout and reset operations are performed on each row one-at-a time and cannot be performed on a plurality of rows simultaneously. In the first frame, when the reset operation is completed on the first row, an integration time for the first row starts. In parallel with the photocharge integration of the first row, the readout and reset operations are performed on the second through n-th rows sequentially. The readout operation of the first row in the second frame cannot be started before the reset operation of the n-th row is completed. Accordingly, the time $t_{INT}$ needs to be at least a time obtained by multiplying the time $t_{SR}$ by (n−1), that is, a time taken to complete the readout and reset operations with respect to the second through n-th rows.

A maximum value $t_{INTMAX}$ of the time $t_{INT}$ is calculated using Equation 2:

$$t_{INTMAX} = \frac{1}{4FPS_D} - t_{SR}, \quad (2)$$

where $FPS_D$ is a frame rate of a depth image, that is, the number of frames per second, and a reciprocal for $FPS_D$ is a time taken to form a depth frame, i.e., $t_{SET}$. Consequently, the time $t_{INT}$ has a maximum value when frames are formed as shown in the first timing chart. When a single depth frame is formed of four frames, a value obtained by adding a result of multiplying $t_{INT}$ by 4 and a result of multiplying $t_{SR}$ by 4 is the same as the time $t_{SET}$, i.e., the reciprocal for $FPS_D$. Equation 2 can be obtained from these formulas. As shown by FIG. 6, the light source 120 is turned off whenever a depth frame is completed, but the inventive concept is not restricted to the current embodiments. The light source 120 may be turned off every time when at least two depth frames are completed in order to prevent the over-saturation and the under-exposure.

Figure 7:
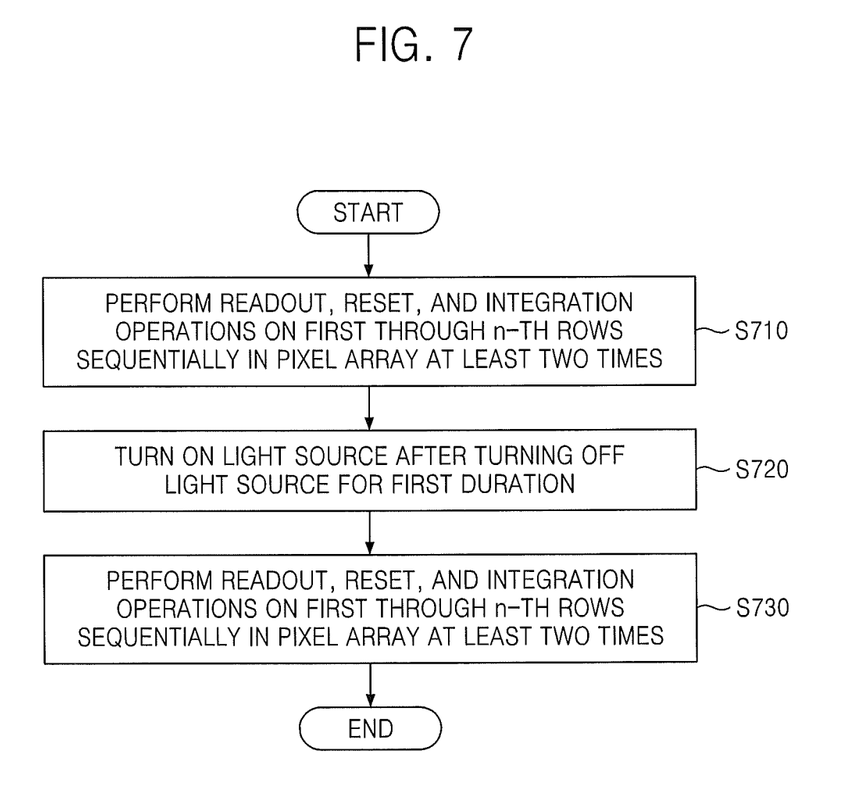
FIG. 7 is a flowchart of the image sensor control method illustrated in FIG. 6.

FIG. 7 is a flowchart of the image sensor control method illustrated in FIG. 6. Referring to FIGS. 6 and 7, readout, reset and integration operations may be performed on the first through n-th rows sequentially in the pixel array 140 at least two times in operation S710. At this time, a readout operation on each pixel included in the first row of the pixel array 140 may be performed first. In other words, the select transistor Sx of each pixel in the first row is turned on by the select signal SEL output from the control unit 112, so that photocharge at the floating diffusion node FD is output to the column driver 117 via the drive transistor Dx. After a predetermined time during which the photocharge is output through the select transistor Sx, the select transistor Sx of each pixel in the first row is turned off and then a reset operation may be performed on the first row. In other words, the reset transistor Rx of each pixel in the first row is turned on by the reset signal RS output from the control unit 112, so that photocharge remaining in the floating diffusion node FD is eliminated. After a predetermined period of the reset operation, the reset transistor Rx is turned off and then a readout operation may be started with respect to the second row. In addition, photocharge integration may be started with respect to the first row in parallel with the start of the readout operation on the second row. In other words, the transfer transistor Tx of each pixel in the first row is turned on by the transfer control signal TG output from the control unit 112, so that photocharge generated by the photodiode PD is transferred to the floating diffusion node FD. These readout, reset, and integration operations may be repeated with respect to the rows sequentially until the integration operation of the n-th row is completed. In addition, the readout, reset, and integration operations performed sequentially on the first through n-th rows may be repeated at least two times (which is assumed to be four times in the embodiments illustrated in FIG. 6), so that a first depth frame is formed.

After the first depth frame is formed, the light source 120 may be turned off for the third duration $t_{LED3}$ in operation S720. In other words, after the readout and reset operations are completed with respect to the entire first through n-th rows, the light source 120 may be turned off by the control unit 112. Until a readout operation on each pixel in the first row of the pixel array 140 is started with respect to a subsequent frame, the off state of the light source 120 may be maintained for the third duration $t_{LED3}$.

After the third duration $t_{LED3}$ elapses, the readout, reset, and integration operations may be performed on the first through n-th rows sequentially in the pixel array 140 at least two times in operation S730. Firstly, the readout operation may be performed on each pixel in the first row of the pixel array 140. In detail, the select transistor Sx of each pixel in the first row is turned on by the select signal SEL output from the control unit 112, so that photocharge at the floating diffusion node FD is output to the column driver 117 via the drive transistor Dx. After the predetermined time during which the photocharge is output through the select transistor Sx, the select transistor Sx of each pixel in the first row is turned off and then a reset operation may be performed on the first row. In other words, the reset transistor Rx of each pixel in the first row is turned on by the reset signal RS output from the control unit 112, so that photocharge remaining in the floating diffusion node FD is eliminated. After the predetermined period of the reset operation, the reset transistor Rx is turned off and then a readout operation may be started with respect to the second row. In addition, photocharge integration may be started with respect to the first row in parallel with the start of the readout operation on the second row. In other words, the transfer transistor Tx of each pixel in the first row is turned on by the transfer control signal TG output from the control unit 112, so that photocharge generated by the photodiode PD is transferred to the floating diffusion node FD. These readout, reset, and integration operations may be repeated with respect to the rows sequentially until the integration operation of the n-th row is completed. In addition, the readout, reset, and integration operations performed sequentially on the first through n-th rows may be repeated at least two times (which is assumed to be four times in the embodiments illustrated in FIG. 6), so that a second depth frame is formed.

When the operation of the image sensor 100 is controlled as described above, the radiation time of the light from the light source 120 is maintained constant with respect to the first through n-th rows in each frame during photocharge integration of each row. Although the 12 rows exist in the pixel array 140 in the current embodiments illustrated in FIG. 6, the inventive concept is not restricted thereto. In the image sensor control method according to the current embodiments, the radiation time of light from the light source 120 is the same with respect to the rows in the pixel array 140 and frames during the photocharge integration of each row even if the light source 120 is turned off, so that the quality of images is increased.

Figure 8:
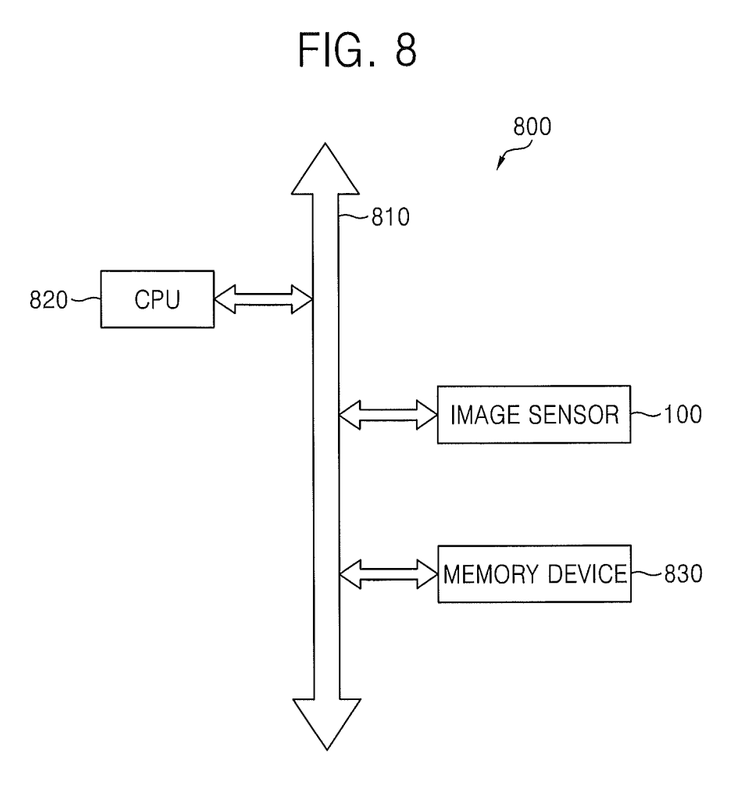
FIG. 8 is a schematic block diagram of a semiconductor system including the image sensor using an image sensor control method according to some embodiments of the inventive concept.

FIG. 8 is a schematic block diagram of a semiconductor system 800 including the image sensor 100 using an image sensor control method according to some embodiments of the inventive concept. Referring to FIG. 8, the semiconductor system 800, e.g., a computer system, may include a bus 810, a central processing unit (CPU) 820, the image sensor 100 using the image sensor control method according to some embodiments of the inventive concept, and a memory device 830. The semiconductor system 800 may also include an interface (not shown), which is connected to the bus 810 and communicate with an outside. Here, the interface may be an input/output interface and may also be a wireless interface.

The CPU 820 may generate a control signal for controlling the operation of the image sensor 100 and may apply the control signal to the image sensor 100 via the bus 810.

The memory device 830 may receive distance information or a 3D image signal including the distance information from the image sensor 100 via the bus 810 and store the distance information or the 3D image signal.

The image sensor 100 may be integrated with the CPU 820 and the memory device 830 or with a digital signal processor (DSP) into a single chip or may be independently implemented in a separate chip.

As described above, according to some embodiments of the inventive concept, even when a light source is turned off in an image sensor, radiation time of light from the light source is constant with respect to rows in a pixel array during photocharge integration of each row, thereby increasing the quality of an image. In addition, the photocharge integration is stopped while the light source is off, thereby preventing an SNR from decreasing.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. An image capture device, comprising:
an image sensor having an array of pixels therein configured to receive light reflected from an object during an image capture time interval;
a light source configured to project light to the object during at least a portion of the image capture time interval; and
a control circuit electrically coupled to said image sensor and said light source, said control circuit configured to drive said light source with signals that cause said light source to continuously project light to the object without interruption during at least a first time interval when all rows of a frame of pixels within the array are being sequentially read to yield a first frame of image data and a second time interval when all rows of the frame of pixels within the array are being sequentially read to yield a second frame of image data, wherein said control circuit is further configured to drive said light source with signals that cause said light source to terminate projection of light to the object during a time interval when all of the rows of the frame of pixels within the array are concurrently capturing image data and none of the rows are being read,
wherein the 3D image sensor operates as a rolling shutter image sensor, and
wherein the light source emits modulated light for acquiring depth information of the object.

2. The image capture device of claim 1, wherein all rows of the frame of pixels are sequentially read and then reset during the first time interval.

3. The image capture device of claim 1, wherein said control circuit is further configured to drive said image sensor with signals that cause the frame of pixels to collect three-dimensional (3D) depth information associated with the first and second frames of image data during the first and second time intervals and a data integration time interval extending between the first and second time intervals.

4. A method of controlling a 3D image sensor, the method comprising the operations of:

performing a readout operation and a reset operation on first through n-th rows sequentially in a pixel array of the 3D image sensor, where "n" is an integer of at least 2;
turning off a light source of the 3D image sensor for a first duration after completing the readout and reset operations; and
performing the readout and reset operations on the first through n-th rows sequentially in the pixel array of the 3D image sensor after the first duration elapses,
wherein the first duration is included in a photocharge integration duration when all of the rows in the pixel array are concurrently capturing image data and none of the rows are being read,
wherein the 3D image sensor operates as a rolling shutter image sensor, and
wherein the light source emits modulated light for acquiring depth information of the object.

5. The image sensor control method of claim 4, wherein the operation of performing the readout and reset operations on the first through n-th rows sequentially in the pixel array comprises turning on and off a select transistor and a reset transistor comprised in each pixel in the first through n-th rows sequentially in the pixel array.

6. The image sensor control method of claim 4, wherein the operation of performing the readout and reset operations on the first through n-th rows sequentially in the pixel array after the first duration elapses comprises turning on and off a select transistor and a reset transistor comprised in each pixel in the first through n-th rows sequentially in the pixel array.

7. The image sensor control method of claim 4, further comprising the operation of stopping accumulating photocharge at a floating diffusion node comprised in each pixel in the first through n-th rows in the pixel array of the 3D image sensor for a second duration after completing the readout and reset operations.

8. The image sensor control method of claim 7, wherein the operation of stopping accumulating photocharge at the floating diffusion node comprised in each pixel in the first through n-th rows in the pixel array for the second duration after completing the readout and reset operations comprises simultaneously turning off all transfer transistors comprised in each pixel in the first through n-th rows in the pixel array and simultaneously turning on the transfer transistors after the second duration time elapses.

9. The image sensor control method of claim 7, wherein the second duration is comprised in the first duration.

10. The image sensor control method of claim 4, wherein the light source is a light emitting diode.

11. A method of controlling a 3D image sensor, the method comprising the operations of:

performing a readout operation, a reset operation, and an integration operation on first through n-th rows sequentially in a pixel array of the 3D image sensor at least two times, where "n" is an integer of at least 2;
turning off a light source of the 3D image sensor after repeating the readout, reset, and integration operations of the first through n-rows at least two times and turning on the light source after a first duration elapses; and
performing the readout, reset, and integration operations on the first through n-th rows sequentially in the pixel array of the 3D image sensor at least two times after the light source is turned on,
wherein the readout, reset, and integration operations are performed by turning on and off a transfer transistor, a select transistor, and a reset transistor, which are comprised in each cell in the first through n-th rows in the pixel array, wherein the first duration is included in a photocharge integration duration when all of the rows in the pixel array are concurrently capturing image data and none of the rows are being read, wherein the 3D image sensor operates as a rolling shutter image sensor, and wherein the light source emits modulated light for acquiring depth information of the object.

12. The image sensor control method of claim 11, wherein the operation of performing the readout operation, the reset operation, and the integration operation on the first through n-th rows sequentially in the pixel array at least two times comprises performing the readout, reset, and integration operations on each row four times.

13. The image sensor control method of claim 11, wherein the operation of performing the readout operation, the reset operation, and the integration operation on the first through n-th rows sequentially in the pixel array at least two times after the light source is turned on comprises performing the readout, reset, and integration operations on each row four times.

14. The image sensor control method of claim 11, wherein a maximum value of time of the integration operation on each of the first through n-th rows in the pixel array is defined as $$t_{INTMAX} = \frac{1}{4FPS_D} - t_{SR},$$

where $FPS_D$ is a frame rate of a depth image, $4FPS_D$ is 4 multiplied by $FPS_D$, and $t_{SR}$ is a time taken to complete the readout and reset operations on each of the first through n-th rows.

15. The image sensor control method of claim 11, wherein a minimum value of time of the integration operation on each of the first through n-th rows in the pixel array is defined as $t_{INTMIN}=(n-1)t_{SR}$, where $t_{SR}$ is a time taken to complete the readout and reset operations on each of the first through n-th rows, $(n-1)t_{SR}$ is the nth value minus 1 multiplied by $t_{SR}$.

16. The image sensor control method of claim 11, wherein the light source is a light emitting diode.

* * * * *